(12) United States Patent
Mitani

(10) Patent No.: US 12,353,356 B2
(45) Date of Patent: Jul. 8, 2025

(54) FILE PROCESSING APPARATUS, FILE PROCESSING METHOD, AND STORAGE MEDIUM

(71) Applicant: CANON KABUSHIKI KAISHA, Tokyo (JP)

(72) Inventor: Shigeyuki Mitani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/062,592

(22) Filed: Dec. 7, 2022

(65) Prior Publication Data

US 2023/0195692 A1  Jun. 22, 2023

(30) Foreign Application Priority Data

Dec. 20, 2021 (JP) .................... 2021-206275

(51) Int. Cl.
*G06F 16/16* (2019.01)
*G06F 16/14* (2019.01)

(52) U.S. Cl.
CPC .......... *G06F 16/164* (2019.01); *G06F 16/148* (2019.01)

(58) Field of Classification Search
CPC ............................. G06F 16/164; G06F 16/148
USPC ........................................................ 707/825
See application file for complete search history.

(56) References Cited

U.S. PATENT DOCUMENTS 10,417,184 B1 *  9/2019  Long ................... G06F 16/1794
2021/0014404 A1 *  1/2021  Mitani ................... H04N 23/63

FOREIGN PATENT DOCUMENTS

JP      2006203694 A  *  8/2006
JP      2009187273 A  *  8/2009
WO  WO-2021065406 A1  *  4/2021  ............ G06F 16/113

OTHER PUBLICATIONS

European Search Report issued Jun. 22, 2023 in corresponding European Application No. 22208721.5.

* cited by examiner

*Primary Examiner* — Giovanna B Colan
(74) *Attorney, Agent, or Firm* — VENABLE LLP

(57) ABSTRACT

There is provided a file processing apparatus. An identification unit identifies, among a plurality of files stored in a first storage region, two or more files that have different extensions from one another as a file group based on a commonality among predetermined portions of file names. A decision unit decides on new file names of respective files in the file group so that the commonality among the predetermined portions is maintained in the file group. A transfer unit transfers, to a second storage region different from the first storage region, the respective files in the file group as files with the new file names that have been decided on.

12 Claims, 8 Drawing Sheets

| TRANSFER SOURCE FILE NAME (MAIN PORTION) | TRANSFER DESTINATION FILE NAME (MAIN PORTION) | |
|---|---|---|
| 1111 | 1111_2021101613211501 | 608 |
| 2222 | 2222_2021101614152681 | 609 |
| 3333 | — | 610 |
| 4444 | — | 611 |
| 5555 | — | 612 |

FIG. 8

| FILE NAME | TIME STAMP |
|---|---|
| 1111.JPG | 21/10/15_09:21:41.21 |
| 2222.JPG | 21/10/15_09:22:25.15 |
| 2000.WAV | 21/10/15_09:22:25.15 |
| 3333.JPG | 21/10/15_13:59:29.44 |
| 4444.JPG | 21/10/18_21:09:22.51 |
| 5555.JPG | 21/10/21_03:12:18.06 |
| 5000.WAV | 21/10/21_03:12:18.06 |

FIG. 9

| TRANSFER SOURCE TIME STAMP | TRANSFER DESTINATION TIME STAMP |
|---|---|
| 21/10/15_09:21:41.21 | 21/11/03_13:31:21.44 |
| 21/10/15_09:22:25.15 | 21/11/03_13:33:14.29 |
| 21/10/15_13:59:29.44 | — |
| 21/10/18_21:09:22.51 | — |
| 21/10/21_03:12:18.06 | — |

| | IMAGE FILE NAME | SOUND FILE NAME | |
|---|---|---|---|
| 1203 | 1111.JPG | — | 1208 |
| 1204 | 2222.JPG | 2000.WAV | 1209 |
| 1205 | 3333.JPG | — | 1210 |
| 1206 | 4444.JPG | — | 1211 |
| 1207 | 5555.JPG | 5000.WAV | 1212 |

FILE PROCESSING APPARATUS, FILE PROCESSING METHOD, AND STORAGE MEDIUM

BACKGROUND OF THE INVENTION

Field of the Invention

The present invention relates to a file processing apparatus, a file processing method, and a storage medium.

Description of the Related Art

Conventionally, there has been a method of, in a system that transfers a large number of files from a client to a server, confirming whether a file with the same name as a transfer target file exists in a folder designated as a transfer destination in order to avoid overwriting of the file in the transfer destination. For example, Japanese Patent Laid-Open No. 2009-187273 discloses a method of confirming whether a file with the same name as a transfer target file exists in a transfer destination folder, and storing the transfer target file with a different name given thereto in a case where the file with the same name exists.

In a case where a plurality of files are mutually associated based on a commonality among predetermined portions of file names (e.g., portions other than extensions), if a file is stored under a different name in a transfer destination with use of the method of Japanese Patent Laid-Open No. 2009-187273, there is a possibility that the commonality among the predetermined portions of the file names will be lost. This may consequently bring about the possibility that association among the files will be lost.

SUMMARY OF THE INVENTION

The present invention has been made in view of the aforementioned situation, and provides a technique that enables a file to be stored under a different name in a transfer destination without impairing inter-file association based on a commonality among predetermined portions of file names.

According to a first aspect of the present invention, there is provided a file processing apparatus, comprising: an identification unit configured to identify, among a plurality of files stored in a first storage region, two or more files that have different extensions from one another as a file group based on a commonality among predetermined portions of file names; a decision unit configured to decide on new file names of respective files in the file group so that the commonality among the predetermined portions is maintained in the file group; and a transfer unit configured to transfer, to a second storage region different from the first storage region, the respective files in the file group as files with the new file names that have been decided on.

According to a second aspect of the present invention, there is provided a file processing method executed by a file processing apparatus, comprising: identifying, among a plurality of files stored in a first storage region, two or more files that have different extensions from one another as a file group based on a commonality among predetermined portions of file names; deciding on new file names of respective files in the file group so that the commonality among the predetermined portions is maintained in the file group; and transferring, to a second storage region different from the first storage region, the respective files in the file group as files with the new file names that have been decided on.

According to a third aspect of the present invention, there is provided a non-transitory computer-readable storage medium which stores a program for causing a computer to execute a file processing method comprising: identifying, among a plurality of files stored in a first storage region, two or more files that have different extensions from one another as a file group based on a commonality among predetermined portions of file names; deciding on new file names of respective files in the file group so that the commonality among the predetermined portions is maintained in the file group; and transferring, to a second storage region different from the first storage region, the respective files in the file group as files with the new file names that have been decided on.

Further features of the present invention will become apparent from the following description of exemplary embodiments with reference to the attached drawings.

BRIEF DESCRIPTION OF THE DRAWINGS

FIG. 8 is a conceptual diagram illustrating a method of associating an image file and a sound file with each other according to a second embodiment.

FIG. 9 is a schematic diagram of a time stamp management table that is generated in a RAM 206 of the information processing apparatus 200, transferred to the file server 300, and held in a RAM 303 at the time of file transfer in the second embodiment.

DESCRIPTION OF THE EMBODIMENTS

Figure 1:
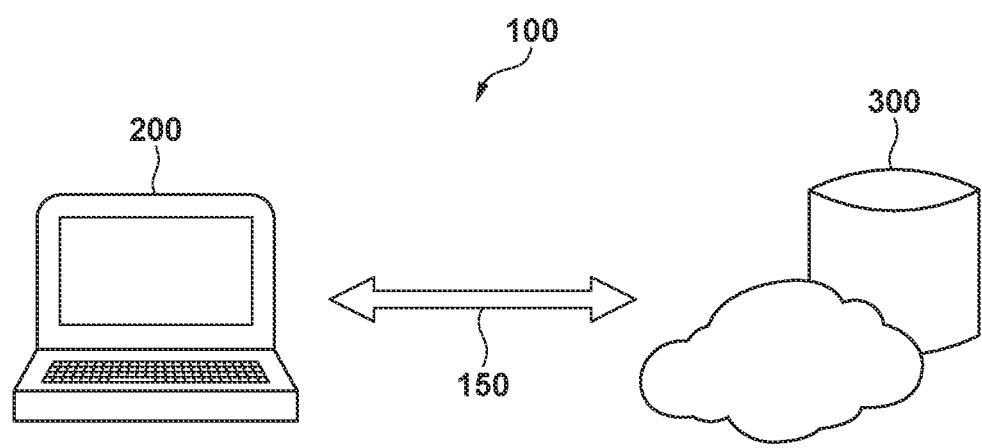
FIG. 1 is a schematic diagram showing a configuration of a file transfer system 100.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

File Transfer System 100

FIG. 1 is a schematic diagram showing a configuration of a file transfer system 100. The file transfer system 100 includes a network 150, an information processing apparatus 200, and a file server 300. The information processing apparatus 200 and the file server 300 both play a role as a file processing apparatus. The information processing apparatus 200 is an information processing apparatus that has a file transfer function, such as a computer and a smart device. The file server 300 is a server system that provides a service with which files can be stored and shared, such as a file sharing site and a cloud storage on the Internet. Alternatively, the file server 300 may be a file server that is installed in an independent network environment, such as a local area network (LAN). The network 150 is a network for connecting the information processing apparatus 200 and the file server 300. The network 150 is configured to include the so-called Internet, intranet, mobile lines, or the like, and connect two or more devices either by wire or wirelessly. It is assumed that the network 150 also includes connection devices or communication devices, such as network hubs, wireless routers, and mobile routers.

Information Processing Apparatus 200

Figure 2:
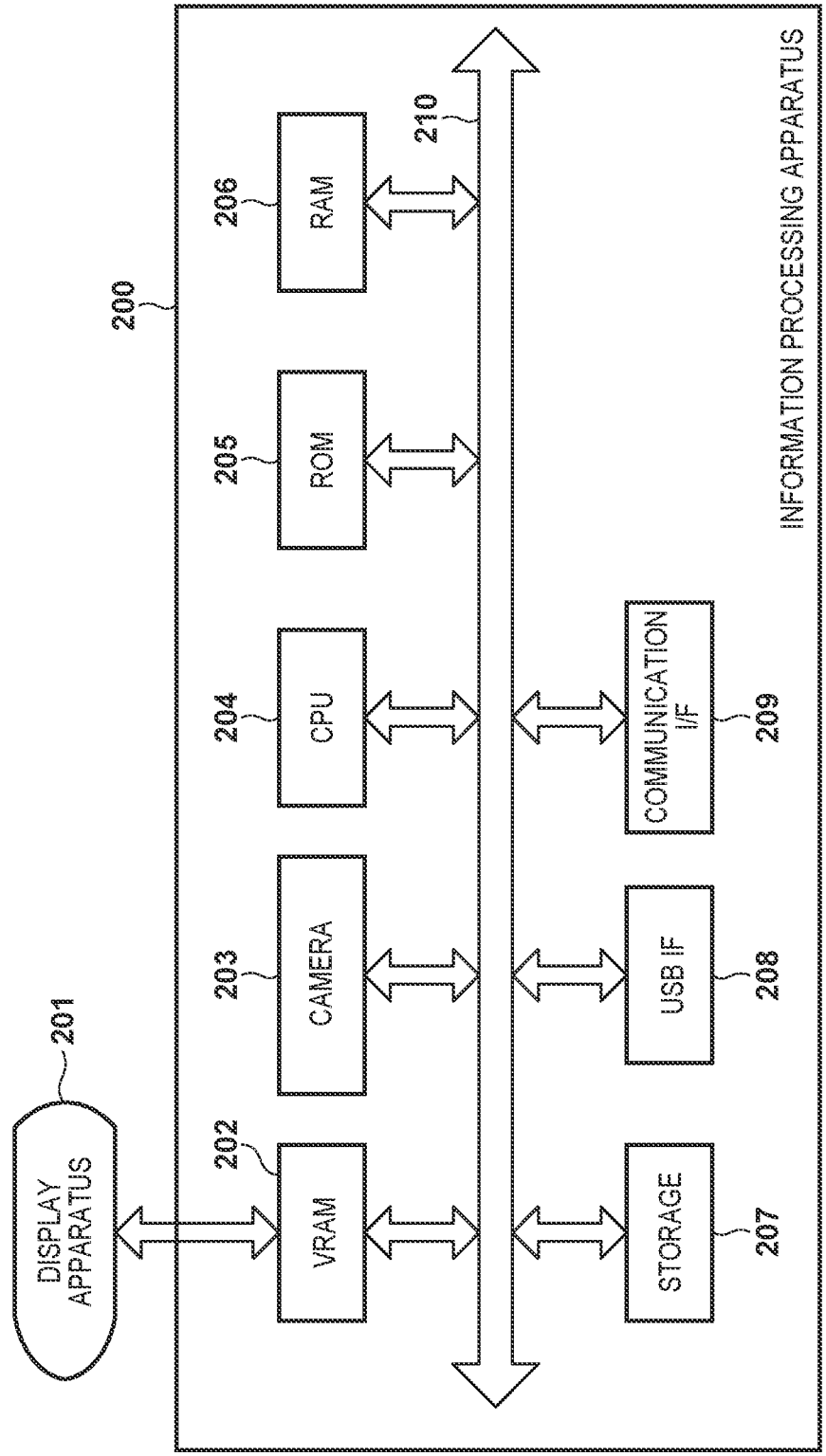
FIG. 2 is a block diagram showing a hardware configuration of an information processing apparatus 200.

FIG. 2 is a block diagram showing a hardware configuration of the information processing apparatus 200. In FIG. 2, 201 is a display apparatus, such as a liquid crystal display (LCD) and an electro luminescent (EL) display, and displays an operation screen and a status display screen of the information processing apparatus 200. Also, the display apparatus 201 includes a pointing device that detects the position of a user input made by, for example, contact made by a finger, a stylus pen, or the like. It is also possible to provide a software keyboard by identifying the positions of character keys based on information of a keyboard-like image displayed on the display apparatus 201.

202 is a Video RAM (VRAM). The VRAM 202 stores images to be displayed on a display screen of the display apparatus 201. The images stored in the VRAM 202 are transferred to the display apparatus 201 in conformity with a predetermined standard; as a result, the images are displayed on the display apparatus 201.

203 is a camera (an optical image information input apparatus) that is built in the information processing apparatus 200. The camera 203 is used to obtain still images, moving images, and the like.

204 is a Central Processing Unit (CPU). Based on various types of control programs stored in a Read Only Memory (ROM) 205 or a storage 207, the CPU 204 controls each constituent element of the information processing apparatus 200 connected to the CPU 204 via a bus 210.

205 is a Read Only Memory (ROM), and holds various types of control programs and data.

206 is a Random Access Memory (RAM), and includes a working area for the CPU 204, an area to which data is saved at the time of error processing, an area to which control programs are loaded, and so forth.

207 is a storage for storing electronic information. The storage 207 includes, for example, a hard disk drive (HDD), a solid-state drive (SSD) which includes a flash memory, or a hybrid drive that uses a hard disk and a flash memory in combination. Also, the storage 207 may include a memory card and a memory card reader. Furthermore, the storage 207 may be in the form of a large-capacity external hard disk drive (HDD) that is connected via a USB interface 208, which will be described below.

208 is a Universal Serial Bus (USB) interface. Such external devices as a USB memory, a Compact Disc (CD) drive, and a Digital Versatile Disc (DVD) drive can be connected to the USB interface 208. The functions of the information processing apparatus 200 can be expanded by connecting such external devices.

209 is a communication interface. The communication interface 209 connects to the network 150 via wired communication, wireless communication, or the like, and communicates with other information processing apparatuses, a printer, a server system on the Internet, and so forth. Also, the communication interface 209 may include an interface that conforms with a communication standard for low power consumption, such as Bluetooth Low Energy (BLT) and Near Field Communication (NFC). Furthermore, the communication interface 209 may also include, for example, an interface module for mobile telephone communication based on a mobile telephone standard, such as 5G and 4G/LTE, and an antenna apparatus that is necessary for input/output of radio waves.

210 is a bus that plays a role as a communication path via which data and communication signals are carried between constituent elements in the information processing apparatus 200.

In the information processing apparatus 200, control programs executed by the CPU 204 can be provided by the ROM 205, RAM 206, or storage 207. Furthermore, it is also possible to provide control programs from other information processing apparatuses and the like to the information processing apparatus 200 via the USB interface 208 or the communication interface 209. Various types of functions of the information processing apparatus 200, such as a clock function, a time determination function, a file transfer function, and a file management function, can be realized by control programs executed by the CPU 204.

File Server 300

Figure 3:
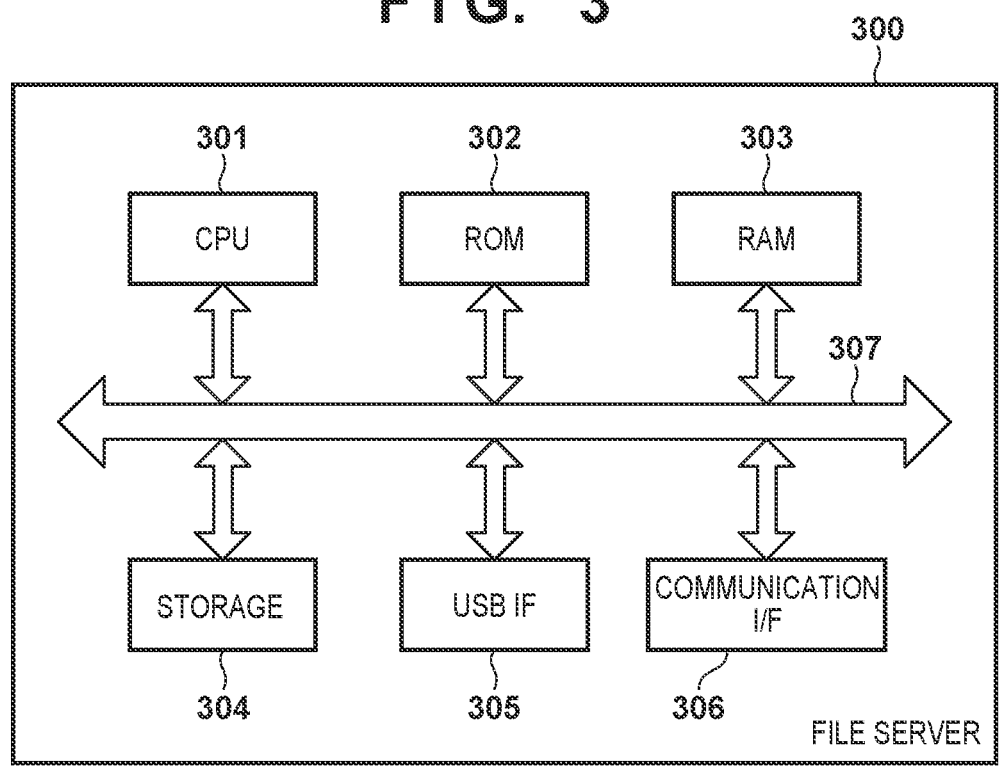
FIG. 3 is a block diagram showing a hardware configuration of a file server 300.

FIG. 3 is a block diagram showing a hardware configuration of the file server 300. In FIG. 3, 301 is a Central Processing Unit (CPU). Based on various types of control programs stored in a Read Only Memory (ROM) 302 or a storage 304, the CPU 301 controls each constituent element of the file server 300 connected to the CPU 301 via a bus 307.

302 is a ROM (Read Only Memory), and holds various types of control programs and data.

303 is a Random Access Memory (RAM), and includes a working area for the CPU 301, an area to which data is saved at the time of error processing, an area to which control programs are loaded, and so forth.

304 is a storage for storing electronic information. The storage 304 includes, for example, a hard disk drive (HDD), a solid-state drive (SSD) which includes a flash memory, or a hybrid drive that uses a hard disk and a flash memory in combination. Also, the storage 304 may include a memory card and a memory card reader. Furthermore, the storage 304 may be in the form of a large-capacity external hard disk drive (HDD) that is connected via a USB interface 305, which will be described below. The storage 304 may be composed of a plurality of large-capacity HDDs or SSDs that guarantee redundancy.

305 is a Universal Serial Bus (USB) interface. Such external devices as a USB memory, a Compact Disc (CD) drive, and a Digital Versatile Disc (DVD) drive can be connected to the USB interface 305. The functions of the file server 300 can be expanded by connecting such external devices.

306 is a communication interface. The communication interface 306 connects to the network 150 via wired communication, wireless communication, or the like, and communicates with other information processing apparatuses, a printer, a server system on the Internet, and so forth. Also, the communication interface 306 may include an interface that conforms with a communication standard for low power consumption, such as Bluetooth Low Energy (BLT) and Near Field Communication (NFC). Furthermore, the communication interface 306 may also include, for example, an interface module for mobile telephone communication based on a mobile telephone standard, such as 5G and 4G/LTE, and an antenna apparatus that is necessary for input/output of radio waves.

307 is a bus that plays a role as a communication path via which data and communication signals are carried between constituent elements in the file server 300.

In the file server 300, control programs executed by the CPU 301 can be provided by the ROM 302, RAM 303, or storage 304. Furthermore, it is also possible to provide control programs from other information processing apparatuses and the like to the file server 300 via the USB interface 305 or the communication interface 306. Various types of functions of the file server 300, such as a file reception function and a file management function, can be realized by control programs executed by the CPU 301.

Files and File Groups

Figure 4:
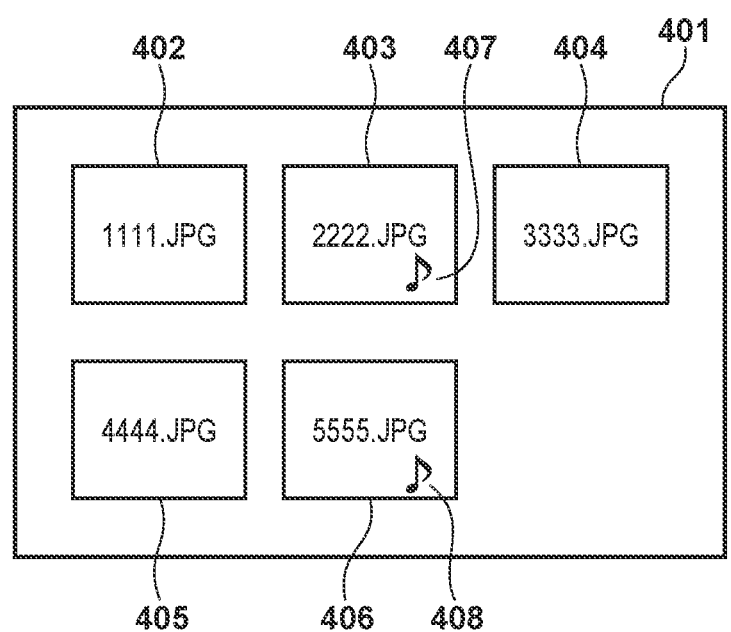
FIG. 4 is a schematic diagram of a thumbnail screen 401 displayed on a display apparatus 201 of the information processing apparatus 200.
Figures 5, 6:
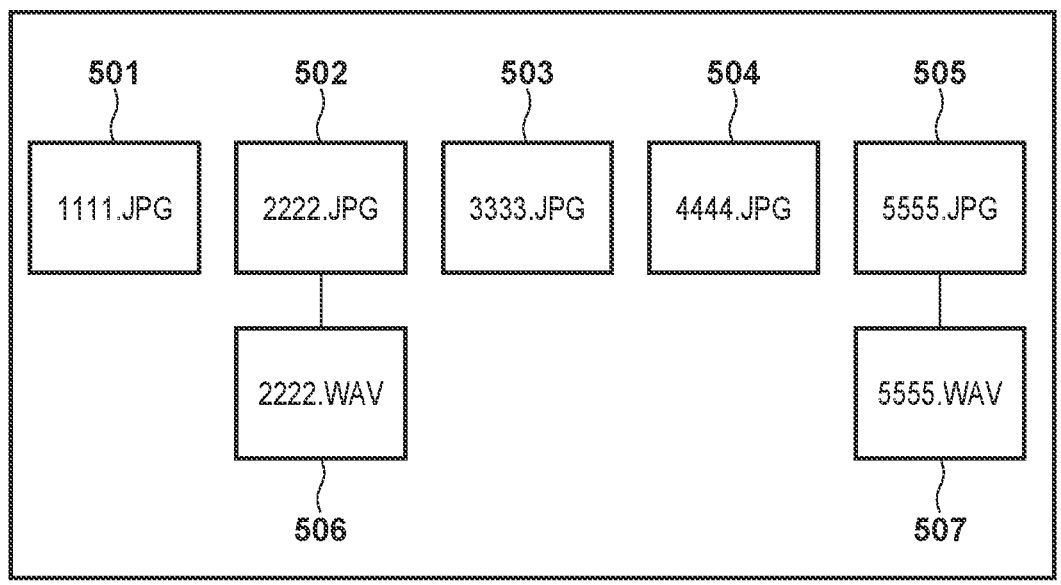
FIG. 5 is a conceptual diagram for describing association between an image file and a sound file according to a first embodiment.
FIG. 6 is a diagram showing a file name management table that is used to manage a file name of a transfer target file according to the first embodiment.

Next, with reference to FIG. 4 and FIG. 5, a description is given of files, as well as file groups that are identified based on a commonality among predetermined portions of file names, which are stored in the storage 207 of the information processing apparatus 200. The storage 207 stores a plurality of files. In the following description, it is assumed that each file is an image file or a sound file obtained from an image capturing apparatus (not shown). Alternatively, the information processing apparatus 200 may have the functions of an image capturing apparatus.

FIG. 4 is a schematic diagram of a thumbnail screen 401 displayed on the display apparatus 201 of the information processing apparatus 200. Thumbnail images of image files stored in the storage 207 are displayed on the thumbnail screen 401. In the example of FIG. 4, five thumbnail images 402 to 406 are displayed. Sound memo icons 407 and 408 are appended to the thumbnail images 403 and 406, respectively. A sound memo icon indicates that there is a sound file associated with an image file (in other words, an image included in the image file is a so-called sound-memo-appended image). A user can select an image file to be transferred to the file server 300 by selecting a thumbnail image on the thumbnail screen 401. In a case where a sound file is associated with the selected image file, the sound file is also automatically selected to be transferred to the file server 300. In the following description, it is assumed that all of the five thumbnail images 402 to 406 have been selected.

FIG. 5 is a conceptual diagram for describing association between an image file and a sound file. In FIG. 5, files 501 to 505 are image files corresponding to the thumbnail images 402 to 406 of FIG. 4. The files 506 and 507 are sound file that correspond to the sound memo icons 407 and 408 of FIG. 4, and include sound memos associated with the images of the files 502 and 505, respectively. The file names of the file 502 and the file 506 are "2222.JPG" and "2222.WAV", respectively, and they share a common portion except for the extensions (hereinafter referred to as a "main portion"). Similarly, the file names of the file 505 and the file 507 are "5555.JPG" and "5555.WAV", respectively, and the file names share a common main portion. In a case where there are two or more files with file names that share a common main portion, the information processing apparatus 200 determines that these two or more files are mutually associated, and identifies these two or more files as a file group. In the example of FIG. 5, two file groups (a file group including the file 502 and the file 506, as well as a file group including the file 505 and the file 507), are identified.

Method of Deciding on New File Name

When transferring a file to (the storage 304 of) the file server 300, the information processing apparatus 200 decides on a new file name, and transfers a transfer target file as a file with the new file name that has been decided on.

A method of deciding on a new file name will be described with reference to FIG. 6. FIG. 6 is a diagram showing a file name management table that is used to manage the file names of transfer target files. Once the user has selected a transfer target file and issued an instruction for starting the transfer, the information processing apparatus 200 generates a file name management table in the RAM 206. At this time, the information processing apparatus 200 registers the main portion of the original file name of the transfer target file with each cell (cell 603 to 607) in column 601 under the description "transfer source file name in (main portion)". Here, with regard to files included in a file group, as the main portions of the file names are the same, registration is performed with respect to one cell regardless of the number of the files (see cell 604 and cell 607).

Subsequently, the information processing apparatus 200 decides on a new file name (a file name for storage in the storage 304 of the file server 300) at the time of the execution of file transfer, and registers a main portion of the new file name with a corresponding cell in column 602 under the description "transfer destination file name in (main portion)" (cells 608 to 612). In the example of FIG. 6, transfer of the file 501 with the main portion "1111" has already been executed, and a main portion of a new file name of the file 501 has been registered with cell 608. Also, transfer of the file with the main portion "2222" has already been executed, and a main portion of a new file name of this file has been registered with cell 609. Here, as files with the main portion "2222", there are two files that are treated as a file group (the files 502 and 506). In this case, registration with cell 609 is performed when transfer of one of the files 502 and 506 is executed, and the main portion of the file name that has already been registered with cell 609 is used when transfer of the other is executed (the details will be described later with reference to FIG. 7). With regard to cells 610 to 612, transfer of corresponding files has not been executed yet, and thus the main portions of new file names have not been registered.

The new file name of a transfer target file includes a character string that is generated by the CPU 204 using a predetermined generation method for each file (or for each file group in a case where the transfer target file is included in a file group) at the time of file transfer. The predetermined generation method is, for example, a method of generating a character string based on time measured by $\frac{1}{100}$ seconds at the time of generation of the character string. In the example of FIG. 6, the time of generation of the character string for the file 501 with a main portion "1111" is 13:21:15:01 on Oct. 16, 2021. Therefore, a character string including "1111" followed by "_" and "2021101613211501", which indicates this time, has been registered with cell 608 as the main portion of the new file name. Generating a character string to be included in a new file name based on time measured by 1/100 seconds in the foregoing manner can reduce the possibility that file names will overlap in the storage 304 of a file transfer destination.

Note that a character string generated for a new file name with use of the predetermined generation method is not limited to a character string indicating the time of generation of the character string, and may include, for example, a randomly-generated character string.

File Transfer Processing

Figure 7:
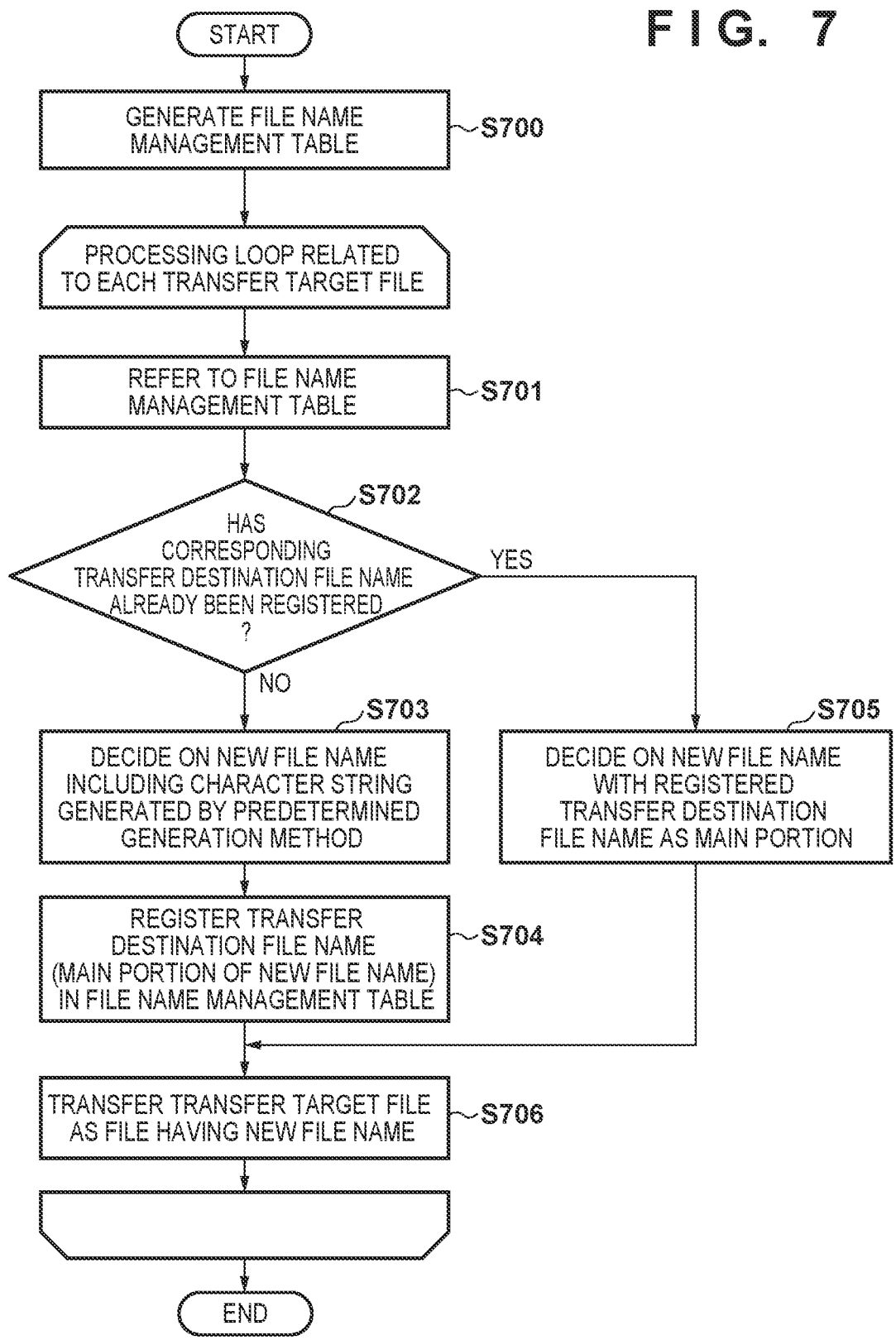
FIG. 7 is a flowchart of file transfer processing according to the first embodiment.

FIG. 7 is a flowchart of file transfer processing according to the first embodiment. Processing of each step in the present flowchart is realized by the CPU 204 of the information processing apparatus 200 deploying control program stored in the ROM 205 to the RAM 206 and executing the control programs, unless specifically stated otherwise. Processing of the present flowchart is started when the user has completed the selection of a transfer target file and issued an instruction for starting the transfer.

In step S700, the CPU 204 generates a file name management table in the RAM 206. As has been described with reference to FIG. 6, the main portion of the original file name of each of a plurality of transfer target files is registered with each cell in column 601 of the file name management table. At this point, new file names have not been decided on yet, and thus each cell in column 602 is blank.

Steps S701 to S706 represent a processing loop that is to be executed with respect to each of the plurality of transfer target files. In step S701, the CPU 204 refers to a cell in column 602 that corresponds to the main portion of the file name of a transfer target file in the file name management table inside the RAM 206. For example, in a case where the main portion of the file name of the transfer target file is "1111", cell 608 is referred to.

In step S702, based on the result of the referencing in step S701, the CPU 204 determines whether the transfer destination file name (the main portion of a new file name) of the transfer target file has already been registered. In a case where the CPU 204 has determined that the transfer destination file name of the transfer target file has already been registered (i.e., a character string associated with a character string of the main portion of the original file name has been stored in the RAM 206), the processing step proceeds to step S705. In a case where the CPU 204 has determined that the transfer destination file name of the transfer target file has not been registered (i.e., a character string associated with a character string of the main portion of the original file name has not been stored in the RAM 206), the processing step proceeds to step S703.

In step S703, the CPU 204 decides on a new file name including a character string that is generated with use of the predetermined generation method described with reference to FIG. 6, as a new file name of the transfer target file.

In step S704, the CPU 204 registers the main portion of the new file name of the transfer target file with column 602 of the file name management table.

In a case where the CPU 204 has determined that the transfer destination file name of the transfer target file has already been registered in step S702, processing of step S705 is executed in place of steps S703 and S704. In step S705, the CPU 204 decides on a file name that includes the registered transfer destination file name as a main portion, as a new file name of the transfer target file.

In step S706 that follows processing of step S704 or step S705, the CPU 204 transfers the transfer target file to the storage 304 of the file server 300 as a file with the new file name that is decided on in step S703 or step S705. For example, the CPU 204 realizes file transfer to the storage 304 by transferring the file with the new file name to the file server 300 together with an instruction for storage to the storage 304. Note that after the file transfer, the CPU 204 may keep holding the file of the transfer source in the storage 207, or may delete the same from the storage 207. That is to say, the file transfer of the present embodiment may be so-called file copying, or may be file migration. The same goes for a second embodiment and a third embodiment, which will be described later.

Here, as an example, assume a case where, among the files 502 and 506 shown in FIG. 5, the file 502 is processed first as a transfer target file, and the file 506 is processed thereafter. In this case, with regard to the file 502, it is determined in step S702 that the transfer destination file name of the transfer target file has not been registered. Therefore, in step S703, for example, "2222_2021101614152681.JPG" is decided as the new file name of the file 502. Also, in step S704, "2222_2021101614152681" is registered with cell 609 in column 602 of the file name management table. On the other hand, with regard to the file 506, it is determined in step S702 that the transfer destination file name of the transfer target file has already been registered. Therefore, in step S705, the new file name of the file 506 is decided on so that it includes the same main portion as the new file name of the file 502, like "2222_2021101614152681.WAV" for example. Consequently, similarly to the plurality of transfer target files stored in the storage 207 of the information processing apparatus 200, the configurations of file groups are maintained also with respect to the plurality of files which are stored in the storage 304 of the file server 300 and which have their respective new file names.

As described above, according to the first embodiment, the information processing apparatus 200 decides on new file names for a plurality of files stored in the storage 207, respectively, in accordance with the decision method that has been described with reference to FIG. 6. According to this decision method, with regard to one or more file groups that are each identified based on a commonality among the main portions of file names, a new file name of each file in each file group is decided on so that the commonality among the main portions is maintained in each file group. Then, the information processing apparatus 200 transfers each of the plurality of files to the storage 304 of the file server 300 as a file with a new file name that has been decided on. In this way, a file can be stored under a different name in a transfer destination without impairing inter-file association based on a commonality among the main portions of file names.

Note that in the foregoing description, it is assumed that the storage 207 of the information processing apparatus 200 is a storage region for files in a transfer source, and the storage 304 of the file server 300 is a storage region for files in a transfer destination. However, the present embodiment is not limited to this configuration. For example, the storage region in the transfer source and the storage region in the transfer destination may be different storages (the storage 207 and a non-illustrated storage) that are included in the information processing apparatus 200. Alternatively, the storage region in the transfer source and the storage region in the transfer destination may be different folders inside the storage 207 of the information processing apparatus 200.

Furthermore, in the foregoing description, it is assumed that a predetermined portion of a file name used in the identification of a file group is the main portion of the file name (a portion other than the extension). In the present embodiment, a predetermined portion of a file name is not limited to the main portion, and may be, for example, a part of the main portion (e.g., a portion other than the first three characters of the main portion).

Second Embodiment

While the first embodiment has been described in relation to a case where file groups are identified based on a commonality among the main portions of file names, a second embodiment will be described in relation to a case where file groups are identified based on a commonality among time stamps of files. In the second embodiment, basic configurations of the file transfer system 100 (FIG. 1), the information processing apparatus 200 (FIG. 2), and the file server 300 (FIG. 3) are similar to those of the first embodiment. Furthermore, the existence of association between an image file and a sound file, which has been described with reference to FIG. 4, is also similar to that of the first embodiment. The following mainly describes the differences from the first embodiment.

FIG. 8 is a conceptual diagram illustrating a method of associating an image file and a sound file with each other according to the second embodiment. In FIG. 8, 801 is a file name, and 802 is a time stamp recorded in a corresponding file. While a time stamp is automatically set based on the date and time on which a file has been generated, or the date and time on which it has been updated, in the system, it is also possible to generate and record a time stamp of an arbitrary date under control of a system program. FIG. 8 depicts the existence of five image files (JPG files) and two sound files (WAV files) on the information processing apparatus 200 on which this system program runs. 802 to 809 indicate the file names of respective files, and none of them share a common main portion. 810 to 816 are time stamps recorded in corresponding files. The time stamps 811 and 812 are identical to each other, and the time stamps 815 and 816 are also identical to each other. As a result, the files 804 and 805 that share a common time stamp are identified as a file group, and similarly, the files 808 and 809 are identified as a file group.

FIG. 9 is a schematic diagram of a time stamp management table that is generated in the RAM 206 of the information processing apparatus 200, transferred to the file server 300, and held in the RAM 303 at the time of file transfer in the second embodiment.

In FIG. 9, 901 denotes a time stamp recorded in each file that exists in the storage 207 in the information processing apparatus 200, which is a transfer source. Time stamps 903, 904, 905, 906, and 907 are registered. 902 denotes a time stamp that is newly recorded in each file that is stored in the storage 304 in the file server 300 as a result of transfer; the time of the start of transfer is registered thereas, rather than the actual time. Time stamps 908 and 909 are time stamps of files or file groups that have already been transferred completely; the values of the date and time that were set at the time of transfer are registered thereas. Spaces for time stamps 910, 911, and 912 are blank because files thereof have not been transferred yet.

Figure 10:
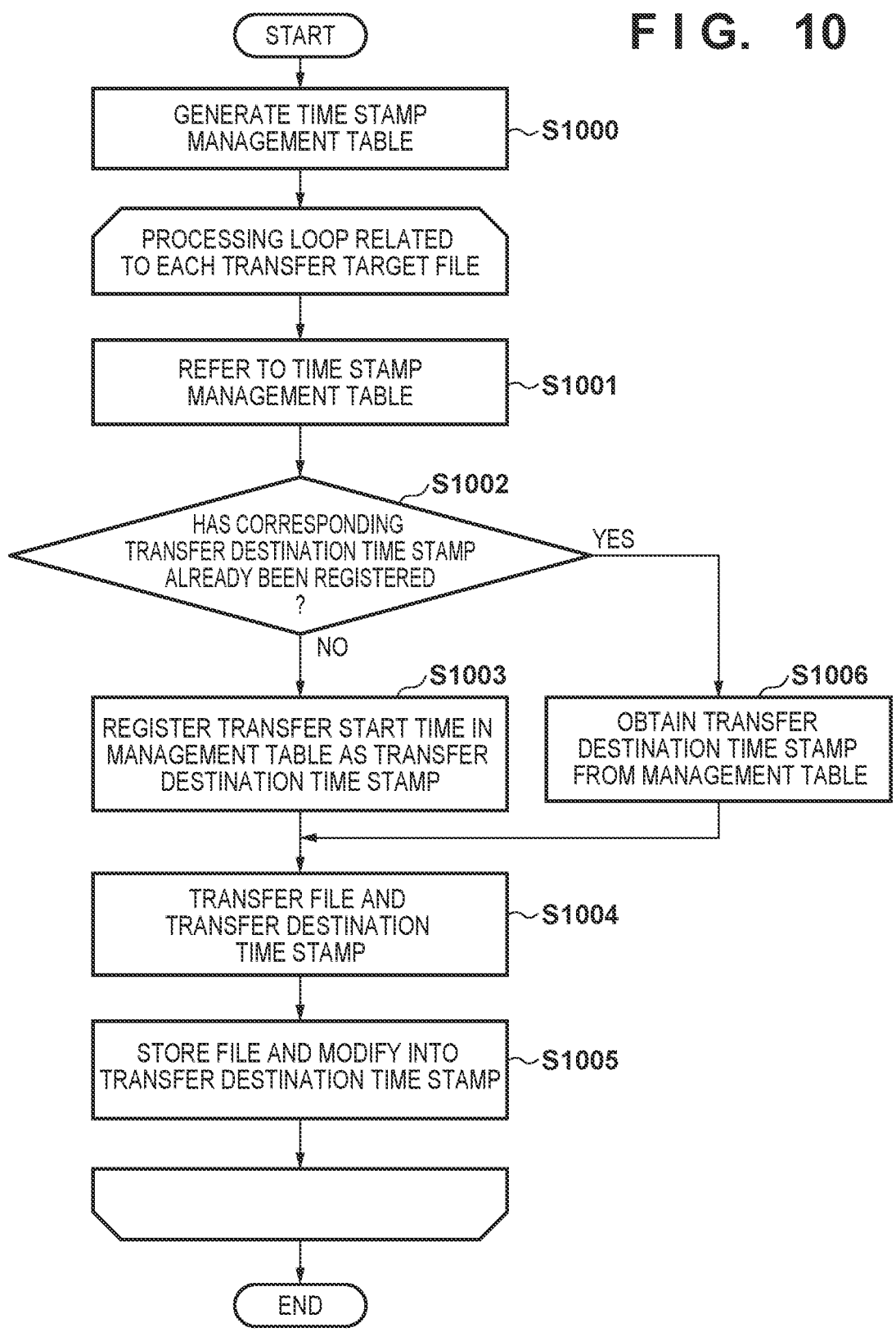
FIG. 10 is a flowchart of file transfer processing according to the second embodiment.

FIG. 10 is a flowchart of file transfer processing according to the second embodiment. Processing of each step in the present flowchart is realized by the CPU 204 of the information processing apparatus 200 deploying control program stored in the ROM 205 to the RAM 206 and executing the control programs, unless specifically stated otherwise. Processing of the present flowchart is started when a user has completed the selection of a transfer target file and issued an instruction for starting the transfer.

In step S1000, the CPU 204 generates a time stamp management table inside the RAM 206. As has been described with reference to FIG. 9, respective time stamps of a plurality of transfer target files (transfer source time stamps) are registered with the time stamp management table. At this point, spaces for the transfer destination time stamps are blank.

Steps S1001 to S1004 represent a processing loop that is to be executed with respect to each of the plurality of transfer target files. In step S1001, the CPU 204 refers to the time stamp management table. In step S1002, based on the result of the referencing in step S1001, the CPU 204 determines whether a transfer destination time stamp corresponding to a transfer source time stamp of a transfer target file has already been registered. In a case where the CPU 204 has determined that the corresponding transfer destination time stamp has already been registered, the processing step proceeds to step S1006. In a case where the CPU 204 has determined that the corresponding transfer destination time stamp has not been registered, the processing step proceeds to step S1003.

In a case where the transfer destination time stamp has not been registered as in the case of the time stamp 910, 911, or 912 shown in FIG. 9, processing of step S1003 is executed. In step S1003, the CPU 204 generates a time stamp through program processing, and registers the generated time stamp with a column (reference sign 902) under the transfer destination time stamp in the time stamp management table. In step S1004, the CPU 204 transfers data of the main part the file and the transfer destination time stamp to the file server 300, which is a transfer destination. In step S1005, the CPU 204 instructs the file server 300 to store the main part the file with the time stamp generated in step S1003 into the storage 304 of the file server 300.

In a case where the transfer destination time stamp has already been registered with the time stamp management table as in the case of the time stamp 908 or 909 shown in FIG. 9, processing of step S1006 is executed. In step S1006, the CPU 204 obtains the registered transfer destination time stamp. In step S1004, the CPU 204 transfers data of the main part the file and the transfer destination time stamp to the file server 300, which is a transfer destination. In step S1005, the CPU 204 instructs the file server 300 to store the main part the file with the time stamp generated in step S1003 into the storage 304 of the file server 300.

As described above, according to the second embodiment, the information processing apparatus 200 stores the file 804 and the file 805, which compose a file group based on a commonality between time stamps thereof, into the file server 300 through the file transfer processing of FIG. 10 so that they share a common time stamp even after the transfer. Therefore, the configuration of the file group can be maintained. The same goes for the files 808 and 809.

In the foregoing description, it is assumed that there is a commonality between time stamps in a case where the time stamps are the same; however, it is permissible to adopt a configuration in which it is determined that there is a commonality between time stamps if the time difference between the time stamps is equal to or shorter than a predetermined interval.

Third Embodiment

While the first embodiment has been described in relation to a case where file groups are identified based on a commonality among the main portions of file names, a third embodiment will be described in relation to a case where an independent file or information that manages association among files is used. In the third embodiment, basic configurations of the file transfer system 100 (FIG. 1), the information processing apparatus 200 (FIG. 2), and the file server 300 (FIG. 3) are similar to those of the first embodiment. Furthermore, the existence of association between an image file and a sound file, which has been described with reference to FIG. 4, is also similar to that of the first embodiment. The following mainly describes the differences from the first embodiment.

Figures 11, 12:
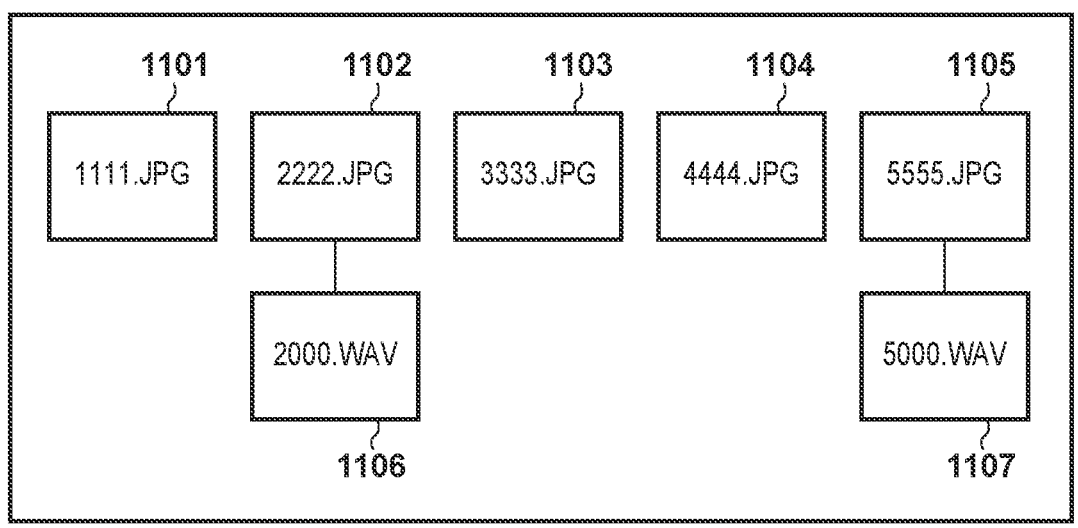
FIG. 11 is a conceptual diagram for describing the configurations of file groups according to a third embodiment.
FIG. 12 is a schematic diagram of a file management table that is used to associate files with one another in order to maintain the configurations of file groups according to the third embodiment.

FIG. 11 is a conceptual diagram for describing the configurations of file groups according to the third embodiment. In FIG. 11, files 1101, 1102, 1103, 1104, and 1105 are image files that are stored in the storage 207 of the information processing apparatus 200 and in a state where they have been deployed to the RAM 206 and are standing by to be selected and transferred. Although image files 1102 and 1105 are respectively different from sound files 1106 and 1107 in terms of file attributes, such as file names and file stamps, they are associated therewith using different information.

FIG. 12 is a schematic diagram of a file management table that is used to associate files with one another in order to maintain the configurations of file groups according to the third embodiment. In FIG. 12, 1200 is a file management table, which is read from the storage 207 to the RAM 206 in the information processing apparatus 200, transferred to the file server 300, deployed to the RAM 303, and stored to the storage 304.

1201 is a file name of each image file existing in the storage 207 in the information processing apparatus 200, which is a transfer source; file names 1203, 1204, 1205, 1206, and 1207 have been registered thereunder.

1202 is a file name of a sound file that forms a file group by being associated with each image file. Sound files with file names 1209 and 1212 are respectively associated with image files with file names 1204 and 1207. File names 1208, 1210, and 1211 corresponding to blank spaces indicate that there are no sound files associated with image files with file names 1203, 1205, and 1206.

In order to avoid overlapping of files in the storage 304 of the file server 300, which is a transfer destination, the information processing apparatus 200 randomly generates file names of respective files when starting the file transfer, and records the generated file names in the file management table 1200. After every image file and sound file has been transferred from the information processing apparatus 200 to the file server 300, the information processing apparatus 200 transfers the file management table 1200 as well to the file server 300. In this way, the configurations of file groups involving all transferred files can be maintained.

As described above, according to the third embodiment, the information processing apparatus 200 manages file groups (inter-file association) based on, for example, the file management table shown in FIG. 12. In this way, a file can be stored under a different name in a transfer destination without impairing inter-file association.

Other Embodiments

The above embodiments have been described in relation to a configuration in which file groups are identified using file names or time stamps. However, similar advantageous effects can be achieved without using file names or time stamps, by using file attributes or metadata uniquely appended to files, or by using network information and hardware information uniquely appended to a device as a part of file names.

Furthermore, although the above embodiments have been described in relation to a file group composed of two files (an image file and a sound file), three or more files may compose a file group.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-206275, filed Dec. 20, 2021, which is hereby incorporated by reference herein in its entirety.

What is claimed is:

1. A file processing apparatus, comprising:
   a processor; and
   a memory storing computer code that, when executed by the processor, causes the file processing apparatus to execute:
   a transfer step of the processor transferring, to a second storage region different from a first storage region, one or more of a plurality of files stored in the first storage region;
   an identification step of the processor identifying, among the plurality of files stored in the first storage region, two or more files that have different extensions from one another as a file group based on a commonality among predetermined portions of file names; and
   a decision step of the processor, in a case where an instruction to transfer one file, which is among the plurality of files stored in the first storage region and which has not been identified as a file group in the identification step, is received from a user, the processor automatically deciding on a new file name of the one file having a first portion which includes at least a part of an original file name and a second portion which is unique with respect to other files, wherein the second portion which is unique with respect to other files is decided on in accordance with a predetermined method, wherein in a case where an instruction to transfer the two or more files, which are among the plurality of files stored in the first storage region and which have been identified as the file group in the identification step, the decision step automatically decides on new file names of respective files in the file group so that the commonality among the predetermined portions is maintained with respect to the first portions of the new file names of the respective files in the file group and the second portions of the new file names of the respective files in the file group are unique with respect to files outside the file group and are common among the respective files in the file group, and wherein the second portions of the new file names of the respective files in the file group are decided on in accordance with the predetermined method.

2. The file processing apparatus according to claim 1, wherein the transfer step transfers the files with the new file names that have been decided by the decision step to the second storage region via an external file processing apparatus.

3. The file processing apparatus according to claim 1, wherein the decision step includes a character string that is generated for the file group in the second portions of the new files names of the respective files in the file group.

4. The file processing apparatus according to claim 3, wherein the character string includes a character string indicating a time of generation of the generated character string, or a character string that is randomly generated.

5. The file processing apparatus according to claim 1, wherein the decision step generates new file names respectively for the plurality of files, the generation of the new file names respectively for the plurality of files includes:

in deciding on a first new file name of a first file with a first file name among the plurality of files, determining whether a character string associated with a character string in the second portion of the first file name has been stored in a storage unit, in a case where the character string associated with the character string in the second portion of the first file name has been stored in the storage unit, using the character string associated with the character string in the second portion of the first file name as the second portion of the first new file name, and in a case where the character string associated with the character string in the second portion of the first file name has not been stored in the storage unit, including a character string that is independently generated on a per-file basis in the second portion of the first new file name, and storing a character string in the second portion of the first new file name into the storage unit in association with the character string in the second portion of the first file name, and the transfer step transfers, to the second storage region, the plurality of files respectively as files with the new file names that have been decided by the decision step.

6. The file processing apparatus according to claim 1, wherein the predetermined portions are portions other than extensions of the file names.

7. The file processing apparatus according to claim 1, wherein the two or more files that have different extensions from one another include an image file and a sound file.

8. The file processing apparatus according to claim 7, further comprising a communication unit configured to communicate with an image capturing apparatus, wherein the image file is received from the image capturing apparatus via the communication unit.

9. The file processing apparatus according to claim 8, wherein the sound file is received from the image capturing apparatus via the communication unit.

10. A file processing method executed by a processor of a file processing apparatus, comprising:

the processor transferring, to a second storage region different from a first storage region, one or more of a plurality of files stored in the first storage region;

the processor identifying, among the plurality of files stored in the first storage region, two or more files that have different extensions from one another as a file group based on a commonality among predetermined portions of file names; and the processor, in a case where an instruction to transfer one file, which is among the plurality of files stored in the first storage region and which has not been identified as a file group in the identifying, is received from a user, automatically deciding on a new file name of the one file having a first portion which includes at least a part of an original file name and a second portion which is unique with respect to other files, wherein the second portion which is unique with respect to other files is decided on in accordance with a predetermined method, wherein in a case where an instruction to transfer two or more files, which are among the plurality of files stored in the first storage region and which have been identified as the file group in the identifying, the processor automatically decides on new file names of respective files in the file group so that the commonality among the predetermined portions is maintained with respect to the first portions of the new file names of the respective files in the file group and the second portions of the new file names of the respective files in the file group are unique with respect to files outside the file group and are common among the respective files in the file group, and wherein the second portions of the new file names of the respective files in the file group are decided on in accordance with the predetermined method.

11. A non-transitory computer-readable storage medium which stores a program for causing a computer processor to execute a file processing method, the program comprising:

code for transferring, by the computer processor, to a second storage region different from a first storage region, one or more of a plurality of files stored in the first storage region;

code for identifying, by the computer processor, among the plurality of files stored in the first storage region, two or more files that have different extensions from one another as a file group based on a commonality among predetermined portions of file names; and code for the computer processor, in a case where an instruction to transfer one file, which is among the plurality of files stored in the first storage region and which has not been identified as a file group in the identifying, is received from a user, automatically deciding on a new file name of the one file having a first portion which includes at least a part of an original file name and a second portion which is unique with respect to other files, wherein the second portion which is unique with respect to other files is decided on in accordance with a predetermined method, wherein in a case where an instruction to transfer two or more files, which are among the plurality of files stored in the first storage region and which have been identified as the file group in the identifying, the processor automatically decides on new file names of respective files in the file group so that the commonality among the predetermined portions is maintained with respect to the first portions of the new file names of the respective files in the file group and the second portions of the new file names of the respective files in the file group are unique with respect to files outside the file group and are common among the respective files in the file group, and wherein the second portions of the new file names of the respective files in the file group are decided on in accordance with the predetermined method.

12. The file processing apparatus according to claim 1, further comprising a clock function to measure time, wherein the decision step decides on a character string for the second portion based on information about the time obtained by the clock function.

* * * * *